United States Patent
Stipe et al.

(10) Patent No.: US 12,436,410 B2
(45) Date of Patent: Oct. 7, 2025

(54) EYEGLASS DEVICES AND RELATED METHODS

(71) Applicant: Meta Platforms Technologies, LLC, Menlo Park, CA (US)

(72) Inventors: Christopher Stipe, Woodinville, WA (US); Marina Zannoli, Bloomington, IN (US); Ian Erkelens, Kirkland, WA (US); Andrew John Ouderkirk, Kirkland, WA (US); Spencer Allan Wells, Seattle, WA (US); Eugene Cho, Seattle, WA (US); John Cooke, Bothell, WA (US); Robin Sharma, Woodinville, WA (US); Jonathan Robert Peterson, Woodinville, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 565 days.

(21) Appl. No.: 17/883,942

(22) Filed: Aug. 9, 2022

(65) Prior Publication Data
US 2023/0057524 A1   Feb. 23, 2023

Related U.S. Application Data

(60) Provisional application No. 63/235,376, filed on Aug. 20, 2021.

(51) Int. Cl.
*G02C 7/08* (2006.01)
*G06F 3/01* (2006.01)

(52) U.S. Cl.
CPC ............ *G02C 7/083* (2013.01); *G02C 7/088* (2013.01); *G06F 3/013* (2013.01)

(58) Field of Classification Search
CPC ........ G02C 7/083; G02C 7/088; G02C 7/086; G06F 3/013; G02B 2027/0178; G02B 3/14; G02B 27/0093; G02B 27/0172
(Continued)

(56) References Cited

U.S. PATENT DOCUMENTS 9,164,202 B2 *  10/2015  Batchko ................... G02B 3/12
9,671,607 B2 *   6/2017  Peyman .................... G02B 7/28
(Continued)

FOREIGN PATENT DOCUMENTS

| EP | 2808725 A1 | 12/2014 |
| EP | 3614193 A1 | 2/2020 |
| WO | 2019072363 A1 | 4/2019 |

OTHER PUBLICATIONS

International Search Report and Written Opinion for International Application No. PCT/US2022/041078, mailed Dec. 8, 2022, 13 pages.
(Continued)

*Primary Examiner* — William R Alexander
(74) *Attorney, Agent, or Firm* — Greenberg Traurig, LLP

(57) ABSTRACT

Eyeglass devices may include a frame shaped and sized to be worn by a user at least partially in front of the user's eyes, a varifocal optical element mounted to the frame, and an eye-tracking element mounted to the frame. The varifocal optical element may include a substantially transparent actuator positioned at least partially within an optical aperture of the varifocal optical element and configured to alter a shape of the varifocal optical element upon actuation. The eye-tracking element may be configured to track at least a gaze direction of the user's eyes, and the varifocal optical element may be configured to change, based on information from the eye-tracking element, in at least one optical property including a focal distance. Various other devices, systems, and methods are also disclosed.

18 Claims, 9 Drawing Sheets

(58) Field of Classification Search
USPC .................................................. 351/159.39
See application file for complete search history.

(56) References Cited

U.S. PATENT DOCUMENTS

| | | | |
|---|---|---|---|
| 10,627,565 B1 | 4/2020 | Trail | |
| 10,852,553 B2* | 12/2020 | Pedder | G02B 3/12 |
| 10,895,737 B1 | 1/2021 | Wells et al. | |
| 10,928,558 B1* | 2/2021 | Cooke | G02B 27/017 |
| 11,372,230 B2* | 6/2022 | Peyman | G02B 27/0075 |
| 2012/0092775 A1* | 4/2012 | Duston | G02B 26/004 |
| | | | 359/666 |
| 2012/0113092 A1 | 5/2012 | Bar-Zeev et al. | |
| 2013/0176628 A1* | 7/2013 | Batchko | G02B 3/12 |
| | | | 359/665 |
| 2016/0070038 A1* | 3/2016 | Peyman | H04N 23/67 |
| | | | 359/666 |
| 2017/0168307 A1 | 6/2017 | Itani | |
| 2019/0302479 A1 | 10/2019 | Smyth et al. | |
| 2020/0096770 A1* | 3/2020 | Pedder | G02B 27/0172 |
| 2020/0166742 A1* | 5/2020 | Peyman | G02B 26/0825 |
| 2020/0177103 A1 | 6/2020 | Lindsay et al. | |
| 2020/0348523 A1 | 11/2020 | Stevens et al. | |
| 2020/0379214 A1 | 12/2020 | Lee et al. | |

OTHER PUBLICATIONS

International Preliminary Report on Patentability for International Application No. PCT/US2022/041078, mailed Feb. 29, 2024, 10 pages.

* cited by examiner

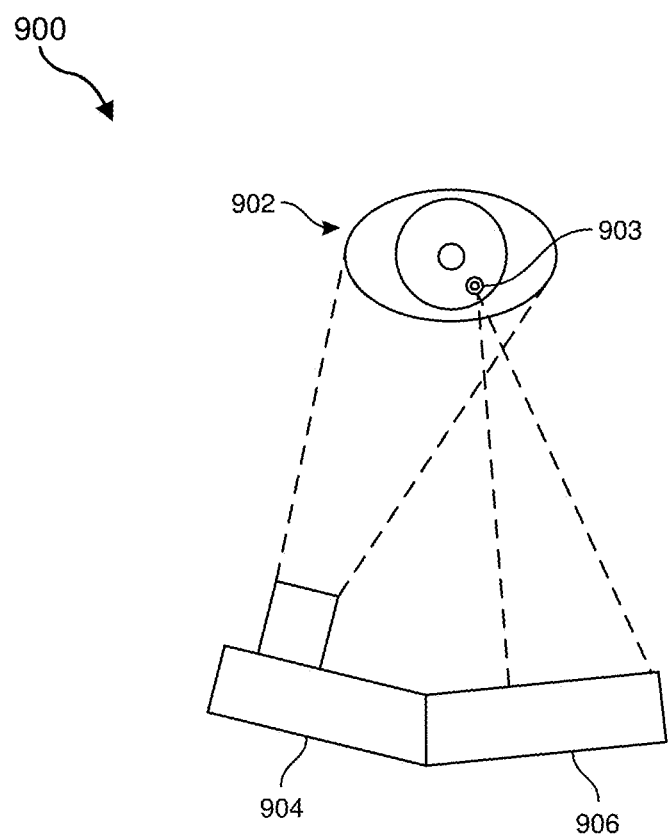
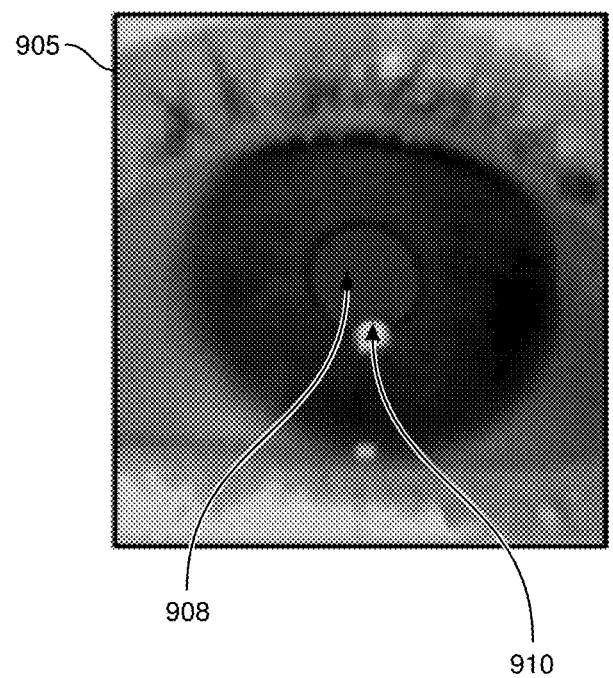
FIG. 9

EYEGLASS DEVICES AND RELATED METHODS

CROSS-REFERENCE TO RELATED APPLICATION

This application claims the benefit of U.S. Provisional Patent Application Ser. No. 63/235,376, filed 20 Aug. 2021, the entire disclosure of which is incorporated herein by this reference.

BRIEF DESCRIPTION OF THE DRAWINGS

The accompanying drawings illustrate a number of example embodiments and are a part of the specification. Together with the following description, these drawings demonstrate and explain various principles of the present disclosure.

FIG. 9 is a more detailed illustration of various aspects of the eye-tracking subsystem illustrated in FIG. 8.

Figure 1A:
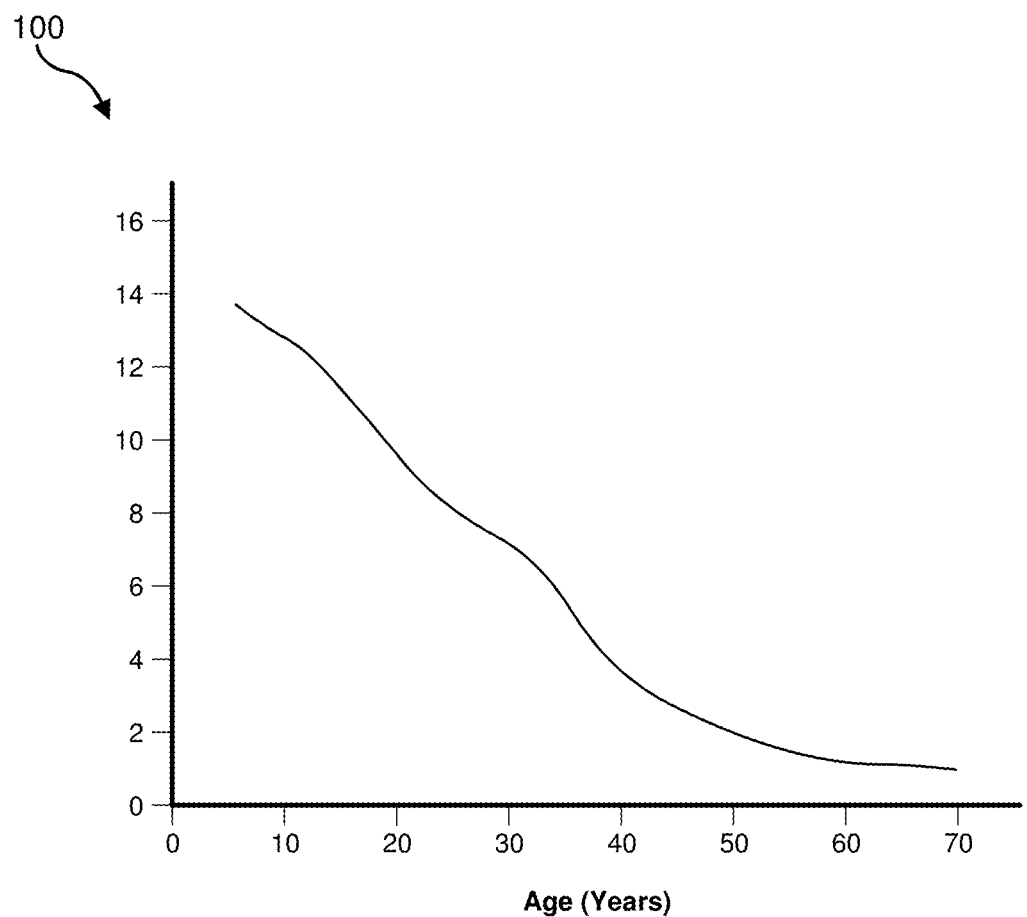
FIG. 1A is a plot illustrating an example loss of accommodative amplitude with age, according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within this disclosure.

DETAILED DESCRIPTION OF EXAMPLE EMBODIMENTS

As people age, they lose their ability to focus on near objects. This condition is called presbyopia. Accommodation is the process by which the eye changes optical power, such as through altering the eye's lens shape, to maintain a clear image or focus on an object as its distance varies. Loss of the ability to accommodate begins at a young age but is generally recognized as a problem when the accommodative amplitude decreases below around 3 or 4 diopters. At this stage, small objects at arm's length cannot be brought into focus. An example loss of accommodative amplitude with age is illustrated in the plot 100 of FIG. 1A, with the vertical axis representing the accommodative amplitude, in diopters, that a human eye is able to achieve and the horizontal axis representing a person's age. As illustrated, people who are younger than about 20 years old can typically accommodate up to about 10-14 diopters, while people over the age of 40 can typically accommodate up to about 4 or fewer diopters.

Typically, eyeglasses are used to correct presbyopia and to allow users to see clearly at various depths. The most common glasses-based solutions include lenses that have a single fixed optical power (commonly referred to as "readers" or "reading glasses"), two or three optical powers in distinct regions of the lens (commonly referred to as "bifocals" and "trifocals"), and lenses with continually varying optical power (commonly referred to as "progressives"). Reading glasses only provide one new focal plane. Users of reading glasses may require multiple pairs of glasses to have the fidelity to see from near- to mid-distance ranges. Bifocals and trifocals reduce the user's field of view at any one focal distance, only provide two or three distinct focal planes, may require the user to tilt their head to view through the correct area of the lens, and distort the peripheral images coming through other sections of the lens.

Progressive lenses usually provide a continuous change between the maximum and minimum optical power states along a vertical corridor down the center of the lens, but the field of view may be greatly reduced, especially in the middle focal plane distances in the center of the lens. The lateral areas of each lens are often referred to as "dead zones" because the extent of the distortion makes them unclear or unusable. Progressive lenses may require the user to tilt and rotate their head to align their vision through the correct area to bring an object into focus. Additionally, visual discomfort results during gaze changes of the eye as the distortion pattern may be highly variable as a function of eye gaze angle, leading to an undesirable visual effect and distortion called "pupil swim."

Figure 1B:
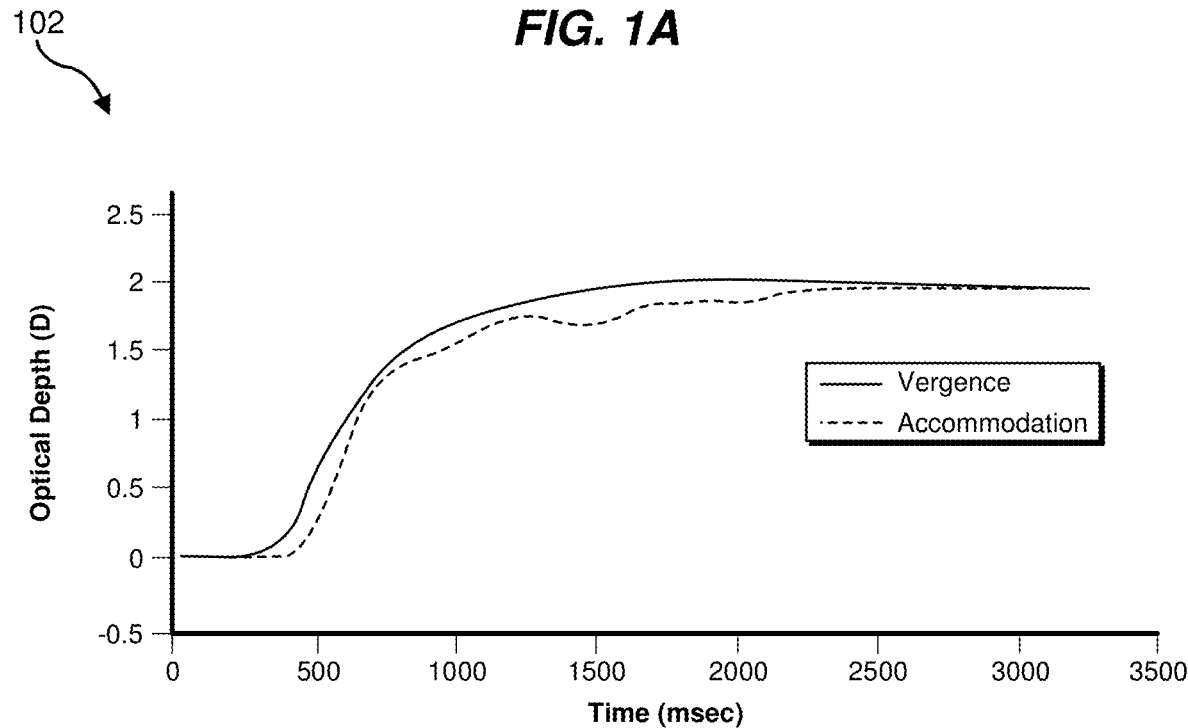
FIG. 1B is a plot illustrating an example response time that person's eyes verge and accommodate to focus on objects at a new distance, according to at least one embodiment of the present disclosure.

Vergence refers to the eyes moving in opposite directions (e.g., inward or outward) as a person gazes at objects at different distances. For example, the eyes will be oriented at a wider gaze angle to view objects that are far away and at a narrower gaze angle to view objects that are close. FIG. 1B illustrates a plot 102 of an example response time that a person's eyes verge and accommodate to focus on objects at a new distance. The black line illustrates the response time of vergence, and the dotted line illustrates the response time of accommodation. As shown in the plot 102, when a person gazes at an object at a new distance, the eyes typically adjust to substantially the proper vergence and accommodation states within about one second (1000 ms). The eyes substantially maintain the vergence and accommodation states after about two to three seconds (2000-3000 ms) while continuing to gaze at the object if the object is stationary.

The present disclosure is generally directed to eyeglass devices that include sufficient hardware to automatically change their optical power, such as to correct for presbyopia as a user's eyes change over time or to refocus as the user's eyes gaze at objects at different distances. In some embodiments, eyeglass devices of the present disclosure include a varifocal optical element mounted to a frame to be in a position in front of the user's eyes, an eye-tracking element mounted to the frame, and a depth-sensing element mounted to the frame. The eye-tracking element may be configured to track a gaze direction of the user's eye and the depth-sensing element may be configured to determine a distance from the frame to objects and surfaces in front of the user. Information from the eye-tracking element and from the depth-sensing element may be used to change at least one optical property (e.g., focal distance, astigmatism correction, etc.) of the varifocal optical element. This eyeglass device may augment the user's natural accommodative adjustments to help the user see more clearly at various depths. In addition, the eyeglass device may adjust in optical power over time to counteract the effects of presbyopia, among other potential benefits.

The following will provide, with reference to FIGS. 2-5, detailed descriptions of various eyeglass devices, systems, and components thereof. With reference to FIG. 6, the following will then provide descriptions of an example method of forming an eyeglass device. Detailed descriptions of an example method of operating an eyeglass device will be provided with reference to FIG. 7. The discussion relating to FIGS. 8 and 9 will explain eye-tracking subsystems and their operation.

Figure 2:
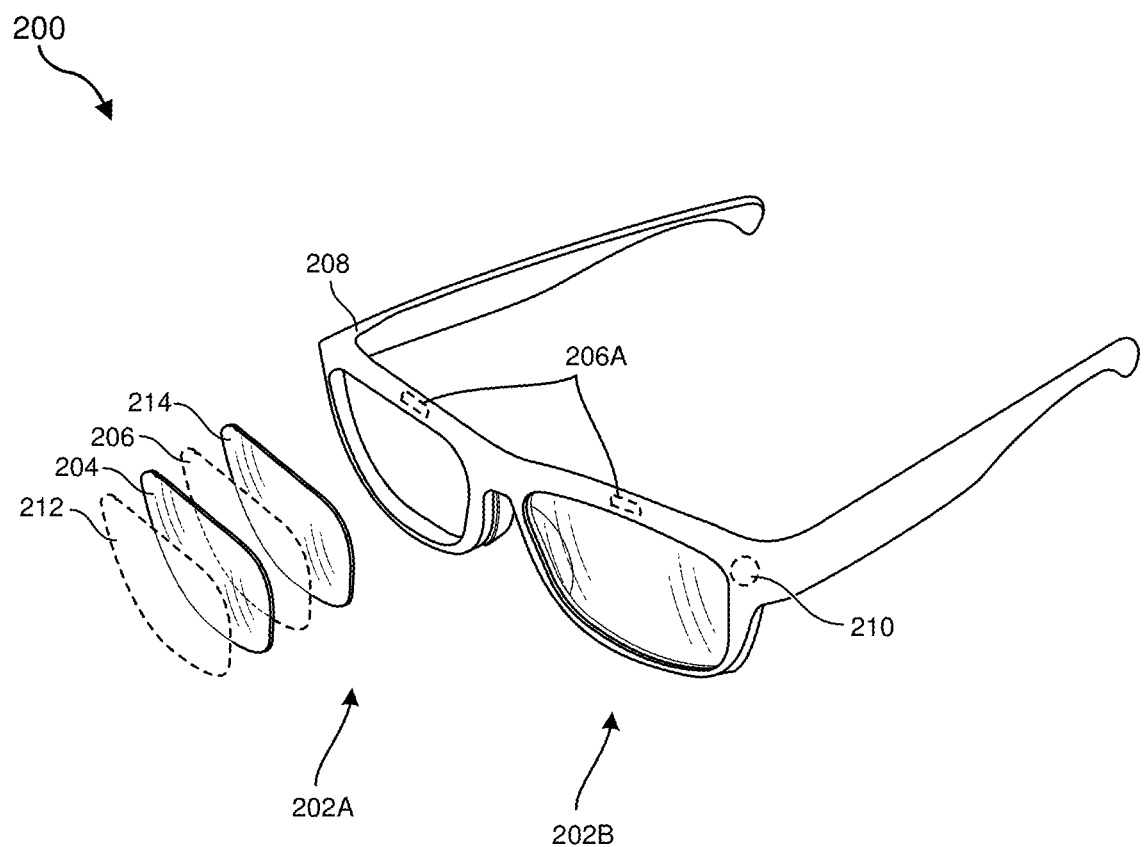
FIG. 2 is a perspective view of an eyeglass device, according to at least one embodiment of the present disclosure.
Figure 3:
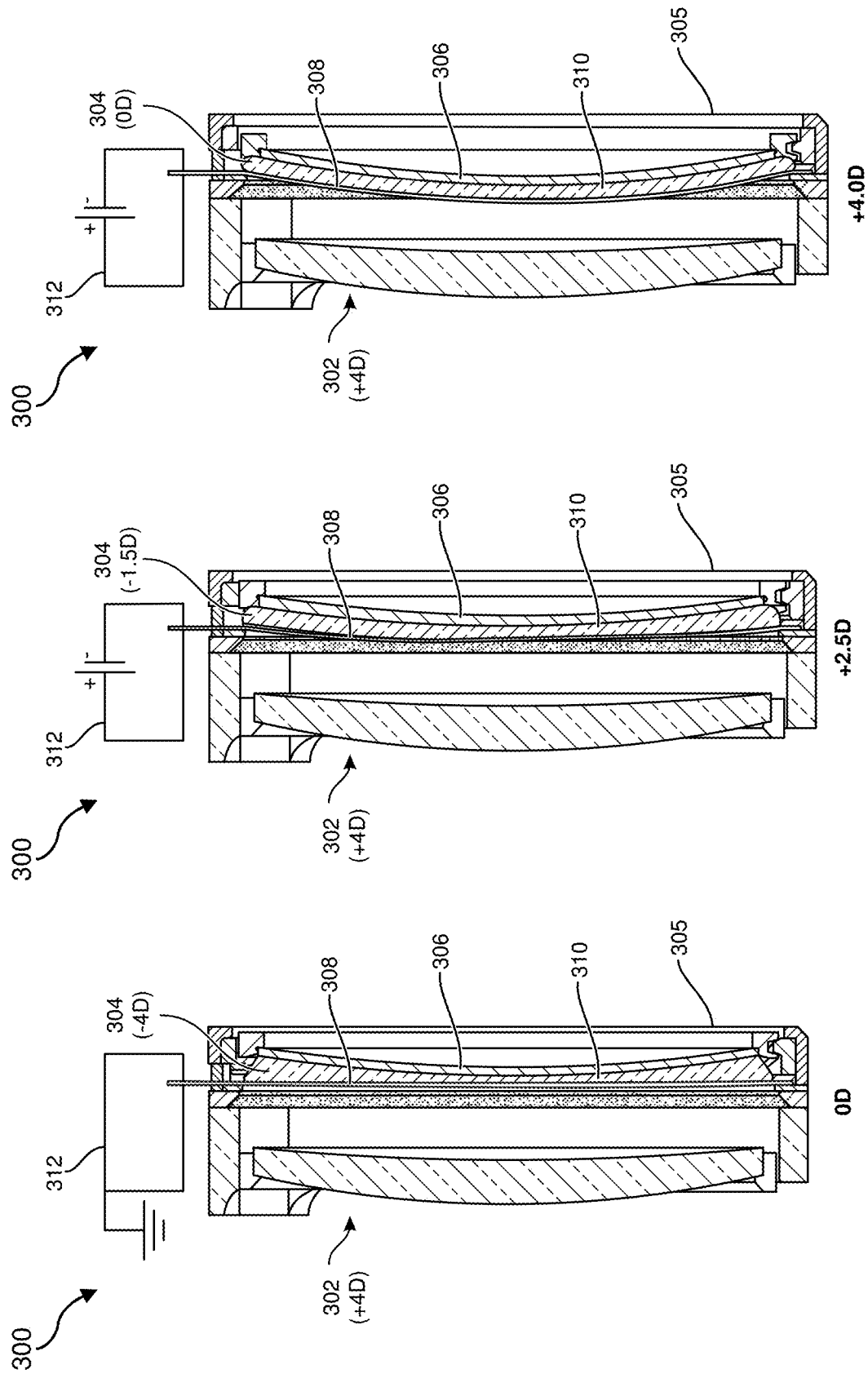
FIGS. 3A-3C are side cross-sectional views of a lens assembly of an eyeglass device, according to at least one embodiment of the present disclosure.
Figure 4:
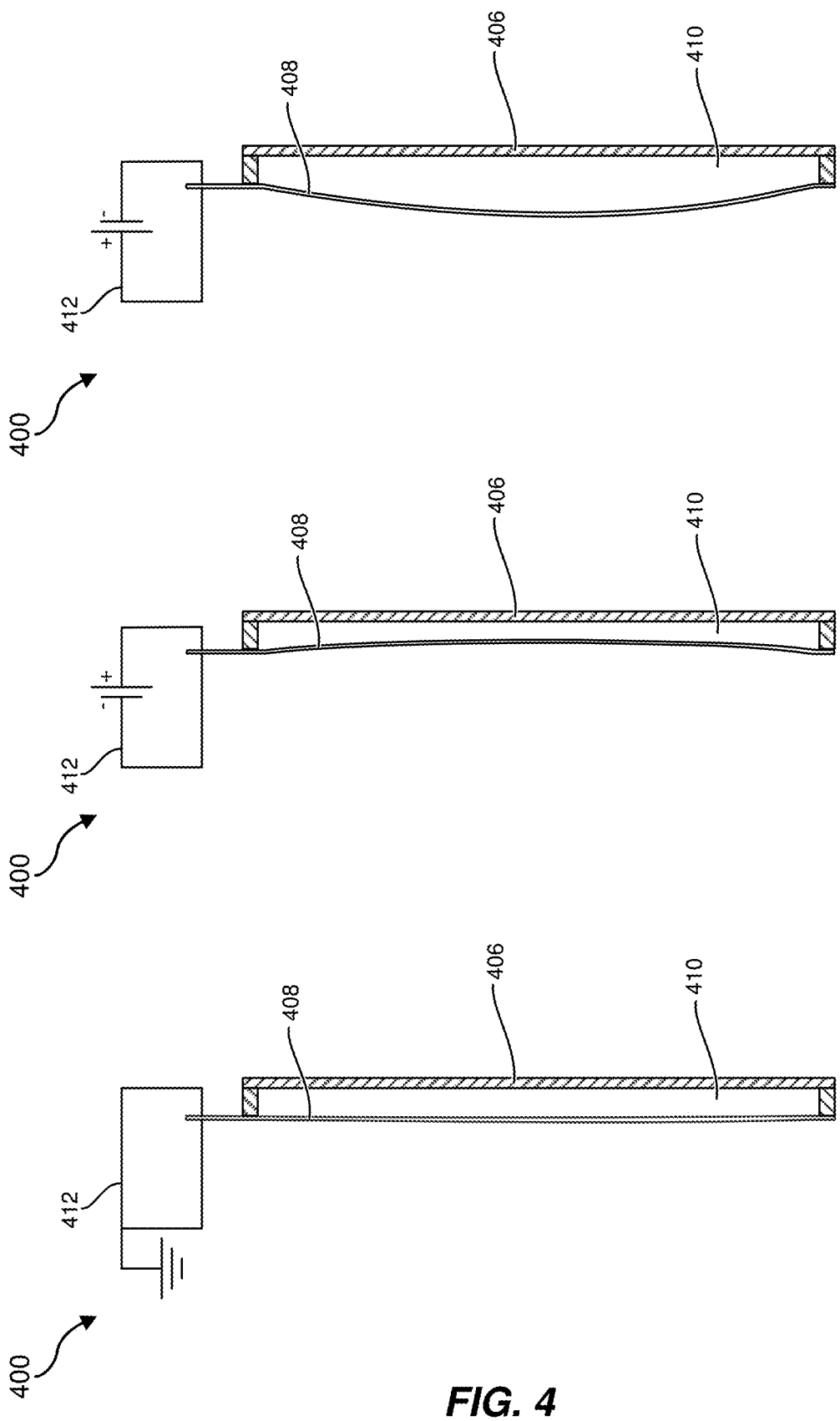
FIGS. 4A-4C illustrate cross-sectional side views of a varifocal optical element, according to at least one embodiment of the present disclosure.

FIG. 2 is a perspective view of an eyeglass device 200, according to at least one embodiment of the present disclosure. The eyeglass device 200 may include a right lens assembly 202A and a left lens assembly 202B (collectively, the "lens assemblies 202") that each include at least a varifocal optical element 204 (identified in FIG. 2 as a varifocal lens) and an eye-tracking element 206, each mounted to an eyeglass frame 208 of the eyeglass device 200. The eyeglass device 200 may also include a depth-sensing element 210, which may also be mounted to the eyeglass frame 208. In some embodiments, the lens assemblies 202 may also include an outer protective cover 212 and an optical lens 214.

In some embodiments, the optical lens 214 may be a prescription lens configured to correct the user's vision and/or replace an inner protective cover that does not exhibit any optical power. Additionally or alternatively, in some embodiments the outer protective cover 212 may be a prescription lens with an optical power. The outer protective cover 212 may include a substantially transparent lens, a darkened lens (e.g., a sunglasses lens), or a photochromic lens that darkens upon exposure to certain light (e.g., ultraviolet light).

In some examples, the terms "substantially" and "substantial," in reference to a given parameter, property, or condition, may refer to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or fully met.

The eyeglass frame 208 may be shaped and sized to be worn by a user at least partially in front of the user's eyes, such as to position the lens assemblies 202 in a field of view of the user's eyes, respectively.

The varifocal optical element 204 may be a substantially transparent element through which the user can gaze and that has at least one optical property (e.g., optical power, focal distance, astigmatism correction, etc.) that can be altered on-demand. As explained further below, in some examples the varifocal optical element 204 may include a so-called "liquid lens," which may include a substantially transparent support element, a substantially transparent deformable element coupled to the support element at least along a periphery of the deformable element, and a substantially transparent deformable medium disposed between the support element and the deformable element. Changing a shape of the deformable element and the deformable medium may change the at least one optical property (e.g., the focal distance, astigmatism correction, etc.) of the varifocal optical element 204.

In a case where the support element is outward-facing (e.g., away from the user during use), the support element may act as a protective cover and the outer protective cover 212 may be omitted. Alternatively, if the support element is inward-facing (e.g., toward the user during use), the outer protective cover 212 may be present to protect the deformable element.

The varifocal optical element 204 (e.g., liquid lens) may also include a varifocal actuator configured to, when actuated, change the shape and consequently the at least one optical property of the varifocal optical element. For example, the varifocal actuator may include a mechanical actuator, an electromechanical actuator, a piezoelectric actuator, an electrostatic actuator, or other actuator that may be configured and positioned to apply an actuating force to a peripheral region of the deformable element. The actuating force may cause the deformable medium to flow and the deformable element to alter its shape (e.g., to be more concave and/or more convex, to alter a cylindricity thereof, etc.), resulting in a change in optical property (e.g., focal distance, astigmatism correction, etc.).

As described below with reference to FIGS. 3A-3C, in additional examples, the deformable element may be or include one or more electroactive materials (e.g., a substantially transparent electroactive polymer, a substantially transparent piezoelectric film, etc.) that may change in shape upon application of a voltage thereto. In other words, the deformable element may be or include a substantially transparent actuator that is positioned within an optical aperture of the varifocal optical element 204 of the eyeglass device 200. In some examples, the electroactive material(s) may be actuated by at least one substantially transparent electrode coupled to the actuator. The electrodes may include a substantially transparent conductive material and/or an opaque conductive material that is applied in a manner to be substantially transparent to the user when the eyeglass device 200 is worn. In this latter case, for example, the electrodes may include sufficiently thin lines of conductive material that may be straight and/or curved (e.g., squiggled) to result in the varifocal optical element 204 exhibiting substantial transparency from the perspective of the user wearing the eyeglass device 200.

In additional examples, the varifocal optical element 204 may include a liquid crystal electroactive material that may be operable to change in focal distance upon application of a voltage thereto.

Optionally, one or more coatings may be applied to the varifocal optical element. For example, a wide-angle antireflective coating (e.g., a so-called "moth eye" antireflective coating) may be applied to the deformable element and/or support element. Such an antireflective coating may, when present, reduce the likelihood that a person near the user of the eyeglass device 200 would notice changes in the optical power of the varifocal optical element 204.

The eye-tracking element 206 may be configured to track at least a gaze direction of the user's eye. The combination of the two eye-tracking elements 206 in the two lens assemblies 202 may be used to also sense a vergence angle of the user's eyes to determine (e.g., estimate) a distance at which the user is gazing (also referred to as the gaze depth of the user's eyes). As illustrated in FIG. 2, the eye-tracking elements 206 may include a substantially transparent lens element (e.g., a waveguide) that is configured to sense a position of the pupil, cornea, retina, sclera, or other eye feature indicative of gaze direction. In this example, the eye-tracking elements 206 may be positioned at least partially within the optical aperture of the varifocal optical element 204 of the eyeglass device 200. Alternatively or additionally, the eyeglass device 200 may include a frame-mounted eye-tracking element 206A, which may include a camera (e.g., a visible light camera and/or an infrared light camera) mounted to the eyeglass frame 208 and directed toward the user's eye. Further descriptions of eye-tracking elements 206, 206A and features thereof are presented below with reference to FIGS. 8 and 9.

The depth-sensing element 210 may include any mechanism or system configured to sense a distance between objects and/or surfaces in front of the user and the eyeglass frame 208 (also referred to as the depth of the objects and/or surfaces). By way of example and not limitation, the depth-sensing element 210 may include a time-of-flight sensor configured to emit light (e.g., infrared light) and to detect the emitted light after reflecting from the objects and/or surfaces and to measure the time-of-flight of the light from emission to detection. By way of another example, the depth-sensing element 210 may include a structured light sensor including an emitter that projects structured light (e.g., in a grid or dot pattern) and an image sensor (e.g., a visible light camera, an infrared light camera, etc.) that detects the projected structured light after reflecting from the objects and/or surfaces. Data from the image sensor may be used to determine the depth of the objects and surfaces by analyzing changes (e.g., distortions) in the reflected structured light.

In some examples, the eyeglass device 200 may lack certain elements of typical artificial-reality glasses (e.g., augmented-reality glasses), such as a near-eye display element conventionally used in artificial-reality glasses to display visual content to the user. The omission of a near-eye display may cause the eyeglass device 200 to be less expensive, lighter weight, and more comfortable for the user to wear. In addition, the eyeglass device 200 may have fewer power and processing needs than a similar device that has a near-eye display element.

The eyeglass device 200 may be operable to adjust at least a focal distance in a variety of situations. For example, when a user's gaze distance changes as determined by the eye-tracking element 206, such as by looking at an object at a new distance, the varifocal optical element 204 may change in focal distance automatically and on the fly to substantially match the user's gaze distance. The depth-sensing element 210 may also provide data to assist in the change of the focal distance, such as data representative of a sensed depth of the object gazed upon by the user.

In another example, a baseline optical power of the varifocal optical element 204 may be changed over time, such as to account for the user's change in vision due to presbyopia and/or to provide visual comfort for the user. The change in baseline optical power over time may take place in one or more discrete instances. For example, the baseline optical power may be changed after a predetermined time based on the user's age or vision history. In this case, the predetermined time between changing the baseline optical power may be more than a day (e.g., daily, weekly, monthly, semiannually, annually, etc.). In additional embodiments, the predetermined time may be less than a day, such as to offer relief and comfort to the user throughout a day as the user's eyes tire from use. Moreover, the change in baseline optical power may be task-based, such as after a predetermined time gazing at a certain distance (e.g., at a computer screen, at a television screen, at a book or other reading material, at a mobile device screen, etc.), to counteract fatigue in the user's eyes.

In some embodiments, a transition rate (e.g., speed) of the change in optical power may be adjusted based on one or more factors. For example, the transition rate may be dependent on a user's age such that a younger user may experience a faster transition rate while an older user may experience a slower transition rate to account for the accommodation and/or vergence speeds of the users. In another example, transition rates may speed up over time to allow a new user to become accustomed to eyeglass devices that automatically adjust.

In further embodiments, the user or a technician (e.g., an optometrist, an ophthalmologist, etc.) may manually adjust the baseline optical power of the varifocal optical element 204 and/or the transition rate. One or more dials, sliders, buttons, electrical connectors, wired or wireless communication elements, or other manual input elements may be mounted to the eyeglass frame 208 to enable such manual adjustments. In some embodiments, manual and/or automatic adjustments may be made via a software interface, such as with a smartphone, a dedicated technician device, a personal computer, a tablet device, a smartwatch, etc., which may be in wired or wireless communication with the eyeglass device 200. The user or technician may periodically adjust the baseline focal distance of the varifocal optical element 204 to improve clarity and focus of objects viewed through the eyeglass device 200. Manual adjustments may also be made to adjust the baseline focal distance and/or transition rate for different users of the eyeglass device 200, and/or to suit a user's personal preferences for baseline focal distance, speed of automatic adjustments, etc. In additional examples, a manual input may be used to deactivate and/or activate automatic optical adjustments.

FIGS. 3A-3C are side cross-sectional views of a lens assembly 300 of an eyeglass device (e.g., the eyeglass device 200) in various states, according to at least one embodiment of the present disclosure. The lens assembly 300 may include an optical lens 302 (e.g., a static lens), a varifocal optical element 304 (e.g., in the form of a liquid lens), and a protective cover 305 over the varifocal optical element 304.

In some examples, the optical lens 302 may be a prescription lens exhibiting an optical power. As illustrated in the example of FIGS. 3A-3D, the optical lens 302 has +4 diopters of optical power. In additional examples, the optical lens 302 may have another optical power or no optical power.

The varifocal optical element 304 may include a substantially transparent support element 306, a substantially transparent deformable element 308 coupled to the support element 306 (e.g., directly or indirectly along a periphery of the deformable element 308), and a substantially transparent deformable medium 310 between the support element 306 and the deformable element 308.

The support element 306 may be rigid and substantially transparent. For example, the support element 306 may be or include a glass material, a polycarbonate material, or other materials commonly used for eyeglass lenses. In some embodiments, the support element 306 may be integrated with other optical components (e.g., eye-tracking elements, ophthalmic correction, etc.) and/or may be relatively thin and rigid. As illustrated in FIGS. 3A-3B, some example support elements 306 may be curved, resulting in the varifocal optical element 304 having at least one curved outer surface.

The deformable element 308 may be or include an actuator that is positioned within an optical aperture of the varifocal optical element 304. For example, as discussed above, the deformable element 308 may include an electroactive material, such as a substantially transparent electroactive polymer, a substantially transparent piezoelectric film, or the like.

By way of example, the deformable element 308 may include one or more dielectric elastomers, a piezoelectric polymer such as polyvinylidene fluoride ("PVDF") or a copolymer thereof, and/or a single crystal ceramic such as lithium niobite, quartz, $K_{0.5}Na_{0.5}NbO_3$ ("KNN"), etc. With dielectric elastomers or other forms of electroactive polymers, the deformable element 308 may include rigid or semi-rigid structural materials for load bearing or for reducing or eliminating the level of pre-tension in the deformable element 308. In these cases, alternative architectures with a wider range of potential material selection, material geometries, and boundary conditions may improve performance and manufacturability.

Deformation of the deformable element 308 may be induced and controlled by a drive circuit 312. For example, as illustrated in FIG. 3A, when no voltage is applied to an actuator of the deformable element 308 by the drive circuit 312, the deformable element 308 may be in an initial, unactuated state (e.g., substantially planar). Due to the curvature of the support element 306, this may result in the varifocal optical element 304 having a first negative optical power.

As illustrated in FIG. 3B, when a first voltage is applied to the actuator of the deformable element 308 by the drive circuit 312, the deformable element 308 may be deformed into a first curved state. In this example, since the deformable element 308 is not curved to the same extent as the support element 306, the varifocal optical element 304 may have a second, lower negative power.

As illustrated in FIG. 3C, when a second, higher voltage is applied to the actuator of the deformable element 308 by the drive circuit 312, the deformable element 308 may be deformed into a second curved state substantially matching the curvature of the support element 306. In this state, the varifocal optical element 304 may have substantially no optical power.

Thus, the varifocal optical element 304 may have a variable optical power. In the example shown in FIG. 3A, the varifocal optical element 304 is in a state that has −4 diopters of optical power. In this state, the lens assembly 300 as a whole may exhibit 0 diopters of optical power, since the −4 diopters of the varifocal optical element counteracts the +4 diopters of the optical lens. In FIG. 3B, the varifocal optical element has an optical power of −1.5 diopters. In this state, the lens assembly 300 as a whole may exhibit +2.5 diopters of optical power, since the −1.5 diopters of the varifocal optical element may be subtracted from the +4 diopters of the varifocal optical element. In FIG. 3C, the varifocal optical element has an optical power of 0 diopters. In this state, the lens assembly 300 as a whole may exhibit +4 diopters of optical power, since the 0 diopters of the varifocal optical element may not optically affect the +4 diopters of the optical lens. These parameters and procedures for changing an overall optical power of the lens assembly 300 are provided as an example of adjusting a baseline optical power and/or adjusting a focal distance on the fly based on the user's gaze direction, as described above.

The states and optical powers shown in FIGS. 3A-3C are provided by way of illustration only. In additional embodiments, the optical lens 302 may have any optical power (including 0 diopters of optical power, a positive optical power, or a negative optical power) and the varifocal optical element 304 may be operable to exhibit a variety of optical powers (including 0 diopters of optical power, a positive optical power, and/or a negative optical power). The lens assembly 300 as a whole may be operable to obtain a variety of overall optical powers depending on the visual needs of the user.

FIGS. 4A-4C illustrate cross-sectional side views of a varifocal optical element 400, according to at least one embodiment of the present disclosure. In some embodiments, the varifocal optical element 400 may be used in place of any of the varifocal optical elements (e.g., varifocal optical elements 204, 304) described herein.

The varifocal optical element 400 of FIGS. 4A-4C may be similar to the varifocal optical element 304 described above with reference to FIGS. 3A-3C. For example, the varifocal optical element 400 may include a substantially transparent support element 406, a substantially transparent deformable element 408, and a substantially transparent deformable medium 410 disposed between the support element 406 and the deformable element 408. The deformable element 408 may be coupled to the support element 406, such as along a periphery of the deformable element 408.

In the example shown in FIGS. 4A-4C, a coupling material 414 (e.g., an adhesive, a material or structure having an intermediate coefficient of thermal expansion between that of the support element 406 and the deformable element 408, a constraining element, a flexible material, etc.) may be used to indirectly couple the deformable element 408 to the support element 406. The coupling material 414 may be rigid or may be compliant. In additional examples, the deformable element 408 may abut against and may be directly coupled to the support element 406 (e.g., without an additional element between the deformable element 408 and the support element 406).

As shown in FIGS. 4A-4C, the support element 406 may be substantially planar, which may result in the support element 406 alone having no optical power.

In some embodiments, the deformable element 408 may be or include an electroactive material acting as a substantially transparent actuator that may be positioned at least partially in an optical aperture of the varifocal optical element 400. A drive circuit 412 may be coupled to the deformable element 408 to cause deformation of the deformable element 408 upon actuation thereof. As illustrated in FIG. 4A, when no voltage is applied to the deformable element 408 by the drive circuit 412, the deformable element 408 may be in an initial, unactuated state (e.g., substantially planar).

As illustrated in FIG. 4B, when a voltage is applied to the deformable element 408 by the drive circuit 412 with a first polarity (e.g., positive), the deformable element 408 may deform toward the support element 406. This may result in the varifocal optical element 400 having an overall negative optical power.

As illustrated in FIG. 4C, when a voltage is applied to the deformable element 408 by the drive circuit 412 with a second, opposite polarity (e.g., negative), the deformable element 408 may deform away from the support element 406. This may result in the varifocal optical element 400 having an overall positive optical power.

Figure 5:
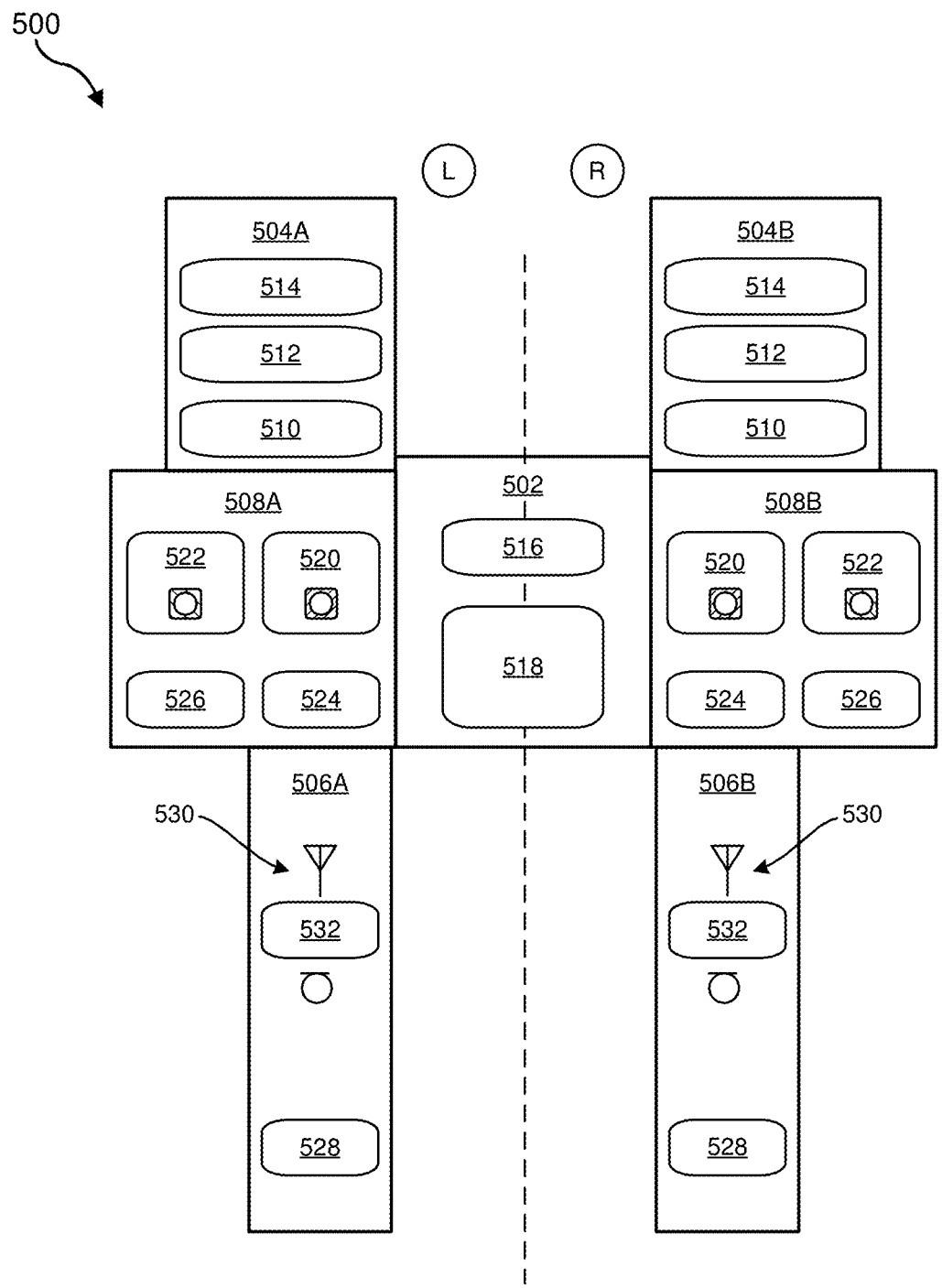
FIG. 5 is a block diagram of an eyeglass device, according to at least one embodiment of the present disclosure.
Figure 6:
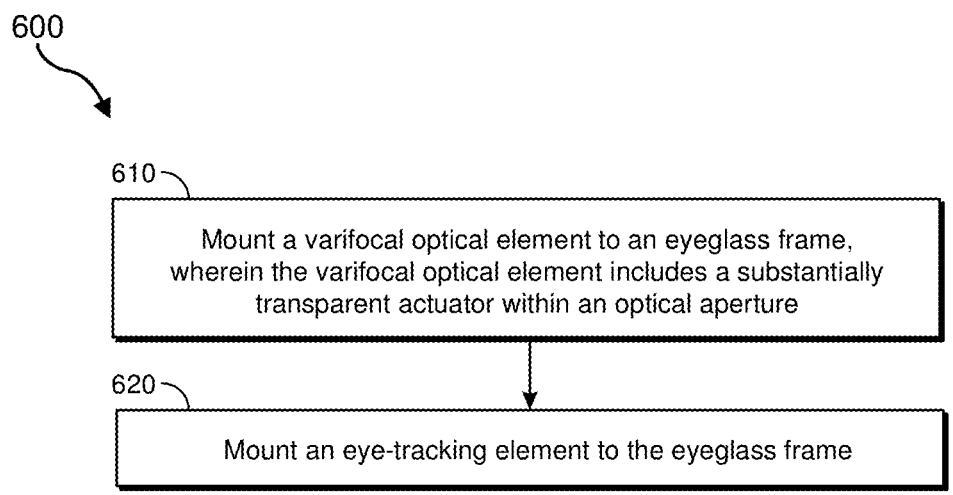
FIG. 6 is a flow diagram illustrating a method of forming an eyeglass device, according to at least one embodiment of the present disclosure.

FIG. 5 is a block diagram of an eyeglass device 500, according to at least one embodiment of the present disclosure. The eyeglass device 500 may include a left side and a right side connected by a center bridge 502. The left side of the eyeglass device 500 may be configured for positioning on a left side of a user's face and head, and may include a left lens assembly 504A, a left temple arm 506A, and a left corner 508A at a junction of the left lens assembly 504A and the left temple arm 506A. The right side of the eyeglass device 500 may be configured for positioning on a right side of the user's face and head, and may include a right lens assembly 504B, a right temple arm 506B, and a right corner 508B at a junction of the right lens assembly 504B and the right temple arm 506B.

As illustrated in FIG. 5, each of the left and right lens assemblies 504A, 504B may include a prescription lens 510, a varifocal optical element 512, and a protective cover 514. In some examples, the lens assemblies 504A, 504B and components thereof may be configured as explained above with reference to FIGS. 2-4C.

The center bridge 502 may house one or more components of the eyeglass device 500. For example, an infrared projector 516 may be positioned in the center bridge 502. The infrared projector 516 may be configured to project infrared light, such as structured infrared light (e.g., in a grid or dot pattern), for depth-sensing. The center bridge 502 may also include at least one processor 518, such as a so-called "system on a chip" or "SoC." By way of example, the SoC may include an in-system programming device, a microcontroller, and/or a communication (e.g., BLUETOOTH™ and/ or Wi-Fi) control element.

Each of the left corner 508A and right corner 508B of the eyeglass device 500 may also include one or more components. For example, an eye-tracking camera 520, a depth-sensing camera 522, a power source 524, and an inertial measurement unit ("IMU") 526 may be positioned in each corner 508A, 508B of the eyeglass device 500. The eye-tracking camera 520 may be configured and oriented to take images (e.g., visible and/or infrared images) of the user's eye to assist in tracking the gaze direction of the user's eye. The eye-tracking camera 520 may be oriented directly at the user's eye and/or may be edge-mounted to a waveguide (e.g., of an infield eye-tracking element within an optical aperture of the lens assemblies 504A, 504B) to receive images from directly in front of the user's eye. The depth-sensing camera 522 may be configured for depth-sensing of objects and/or surfaces in front of the user. The power source may be configured to apply a voltage to change at least one optical property (e.g., focal distance) of the varifocal optical element 512, such as by changing a shape thereof, activating a liquid crystal element thereof, etc. The IMU 526 may include, for example, an accelerometer, a gyroscope, a magnetometer, etc., configured to sense movement (e.g., acceleration, translation, rotation, orientation, etc.) of the eyeglass device 500.

Each of the left temple arm 506A and the right temple arm 506B of the eyeglass device 500 may include additional components. For example, another power source 528 (e.g., a battery) and a wireless communication element 530 may be housed in each temple arm 506A, 506B. For example, the left temple arm 506A may include a wireless antenna configured to transmit and/or receive signals in a BLUETOOTH™ range and the right temple arm 506B may include a wireless antenna configured to transmit and/or receive signals in a Wi-Fi range. The temple arms 506A, 506B may each include a wireless communication integrated circuit (e.g., a radio frequency integrated circuit ("RFIC")) 532 to interface with the respective wireless antenna of the wireless communication elements 530.

The locations of the various components of the eyeglass device 500 are illustrated by way of example and not limitation. In additional embodiments, the described components may be positioned in any suitable location on or in the eyeglass device 500.

FIG. 6 is a flow diagram illustrating a method 600 of forming an eyeglass device, according to at least one embodiment of the present disclosure. At operation 610, a varifocal optical element may be mounted to an eyeglass frame. Operation 610 may be performed in a variety of ways. For example, the varifocal optical element may be any of the varifocal optical elements described above. In some embodiments, the varifocal optical element may include a substantially transparent actuator positioned at least partially within an optical aperture of the varifocal optical element. The varifocal optical element may be mounted in a location such that the user may view a real-world environment in front of the user through the varifocal optical element. The varifocal optical element may be configured to change on-demand in at least one optical property including a focal distance.

At operation 620, an eye-tracking element may be mounted to the eyeglass frame. Operation 620 may be performed in a variety of ways. For example, the eye-tracking element may be any of the eye-tracking elements discussed above. The eye-tracking element may include a camera mounted on the eyeglass frame with a direct view of the user's eye, and/or the eye-tracking element may view the user's eye through an infield element, such as a waveguide within an optical aperture of the eyeglass frame. The eye-tracking element may be configured to track at least a gaze direction of the user's eye. The varifocal optical element may be configured to change in the at least one optical property based on information (e.g., a gaze direction, a vergence angle, etc.) from the eye-tracking element.

The method 600 may, in some embodiments, include additional operations. For example, a depth-sensing element may be mounted to the eyeglass frame. The depth-sensing element may be any of the depth-sensing elements described above. The depth-sensing element may be configured to determine a distance from the eyeglass frame to objects and surfaces in front of the user to assist in determining a depth at which the user gazes and fixates. Thus, the depth-sensing element may provide additional information, in combination with the information from the eye-tracking element, for changing the at least one optical property of the varifocal optical element.

In additional embodiments, other components of the eyeglass device, as explained and described above with reference to FIGS. 2-5, may be mounted to the eyeglass frame in suitable locations for proper functioning.

Figure 7:
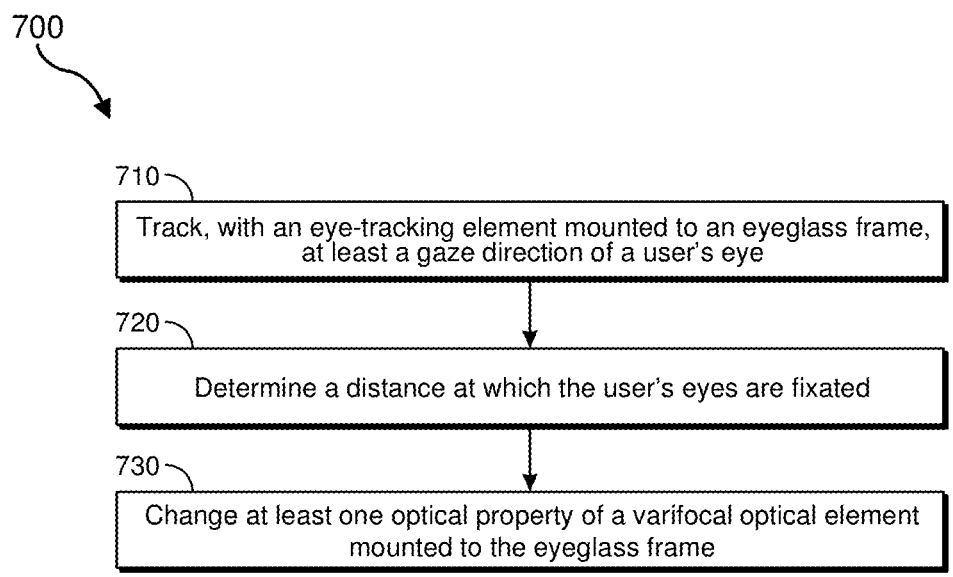
FIG. 7 is a flow diagram illustrating a method of operating an eyeglass device, according to at least one embodiment of the present disclosure.

FIG. 7 is a flow diagram illustrating a method 700 of operating an eyeglass device, according to at least one embodiment of the present disclosure. At operation 710, an eye-tracking element mounted to an eyeglass frame may track at least a gaze direction of a user's eye. Operation 710 may be performed in a variety of ways. For example, any of the eye-tracking elements discussed above may be used to perform operation 710. The eye-tracking element may be mounted to an eyeglass frame. In some embodiments, at least a portion (e.g., a waveguide) of the eye-tracking element may be positioned such that the user may view a real-world environment in front of the user through the portion of the eye-tracking element.

Operation 720 may include determining a distance at which the user's eyes are fixated. Operation 720 may be performed in a variety of ways. For example, the gaze direction may be used to determine the distance at which the user's eyes are fixated, such as by calculating a vergence angle between the gaze directions of the user's eyes. In additional examples, information from a depth sensor may also be used to assist in determining the fixation distance.

At operation 730, at least one optical property of a varifocal optical element may be changed based on the tracked gaze direction from operation 710 and the determined distance from operation 720. Operation 730 may be performed in a variety of ways. For example, any optical property, such as a focal distance, astigmatism correction, etc., of the varifocal optical elements described above may be changed. The varifocal optical element may include a substantially transparent actuator positioned at least partially within an optical aperture of the varifocal optical element. The actuator may be configured to alter a shape of the varifocal optical element upon actuation.

The method 700 may include additional operations as mentioned above. For example, a baseline optical power of the varifocal optical element may be changed after a predetermined time, such as to treat presbyopia and/or to improve the user's comfort. The predetermined time may be less than a day (e.g., for improved comfort during a day) or more than a day (e.g., for treating presbyopia or other changes in the user's vision over time).

Accordingly, the present disclosure includes eyeglass devices, systems, and methods that may improve eyesight and user experience for a variety of users who may benefit from prescription eyeglasses. The eyeglass devices may be configured to change in at least one optical property (e.g., focal distance) in response to movements (e.g., vergence) of the user's eyes and/or over time to correct for presbyopia. These changes may be made automatically or manually and may reduce or eliminate a need for the user to keep multiple eyeglasses, to buy new and updated eyeglasses over time, and to use bifocal, trifocal, or progressive lenses.

Some of the eyeglass devices and systems of the present disclosure may include optical subsystems having one or more lenses (e.g., conventional concave or convex lenses, Fresnel lenses, adjustable liquid lenses, etc.) through which a user may view a real-world environment in front of the user. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture, such as a single lens configuration that directly collimates light but results in so-called pincushion distortion, and/or a pupil-forming architecture, such as a multi-lens configuration that produces so-called barrel distortion to nullify pincushion distortion.

The eyeglass devices and systems described herein may also include various types of computer vision components and subsystems. For example, the eyeglass devices and systems may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

As noted above, in some embodiments, the systems described herein may include an eye-tracking subsystem designed to identify and track various characteristics of a user's eye(s), such as the user's gaze direction. The phrase "eye tracking" may, in some examples, refer to a process by which the position, orientation, and/or motion of an eye is measured, detected, sensed, determined, and/or monitored. The disclosed systems may measure the position, orientation, and/or motion of an eye in a variety of different ways, including through the use of various optical-based eye-tracking techniques, ultrasound-based eye-tracking techniques, etc. An eye-tracking subsystem may be configured in a number of different ways and may include a variety of different eye-tracking hardware components or other computer-vision components. For example, an eye-tracking subsystem may include a variety of different optical sensors, such as two-dimensional (2D) or 3D cameras, time-of-flight depth sensors, single-beam or sweeping laser rangefinders, 3D LiDAR sensors, and/or any other suitable type or form of optical sensor. In this example, a processing subsystem may process data from one or more of these sensors to measure, detect, determine, and/or otherwise monitor the position, orientation, and/or motion of the user's eye(s).

Figure 8:
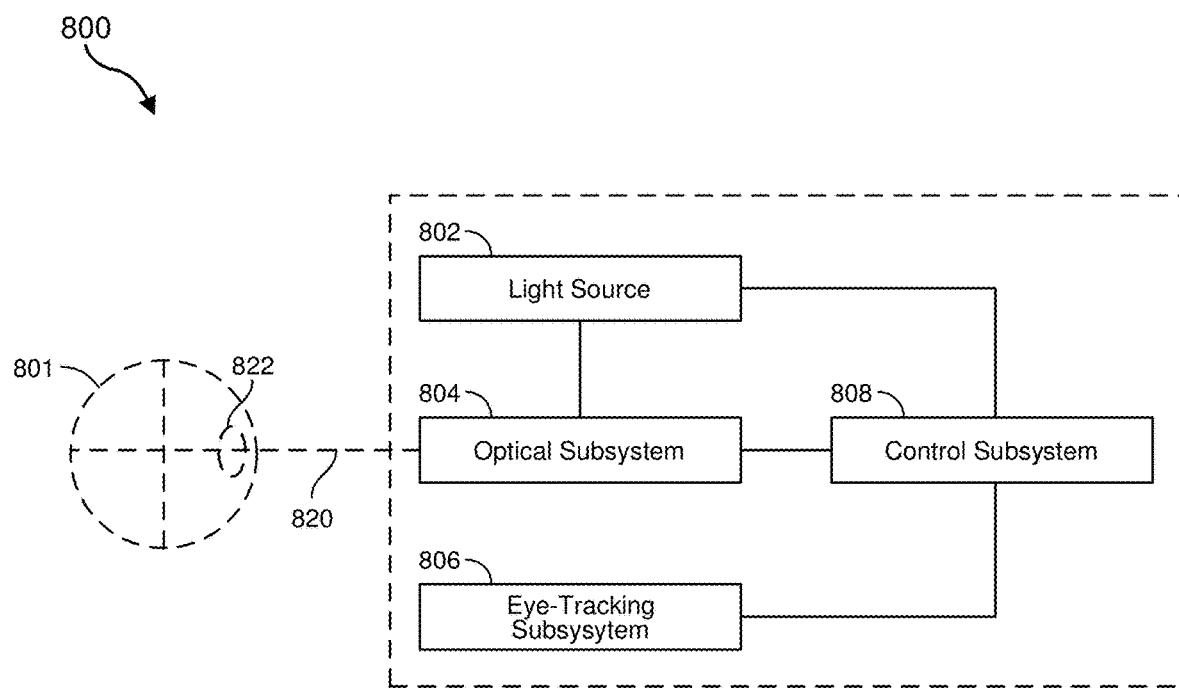
FIG. 8 an illustration of an exemplary system that incorporates an eye-tracking subsystem capable of tracking a user's eye(s).

FIG. 8 is an illustration of an exemplary system 800 that incorporates an eye-tracking subsystem capable of tracking a user's eye(s). As depicted in FIG. 8, the system 800 may include a light source 802, an optical subsystem 804, an eye-tracking subsystem 806, and/or a control subsystem 808. In some examples, the light source 802 may generate light for an image (e.g., to be presented to an eye 801 of the viewer). The light source 802 may represent any of a variety of suitable devices. For example, the light source 802 can include a two-dimensional projector (e.g., a LCoS display), a scanning source (e.g., a scanning laser), or other device (e.g., an LCD, an LED display, an OLED display, an active-matrix OLED display (AMOLED), a transparent OLED display (TOLED), a waveguide, or some other display capable of generating light for presenting an image to the viewer). In some examples, the image may represent a virtual image, which may refer to an optical image formed from the apparent divergence of light rays from a point in space, as opposed to an image formed from the light ray's actual divergence.

In some embodiments, the optical subsystem 804 may receive the light generated by the light source 802 and generate, based on the received light, converging light 820 that includes the image. In some examples, the optical subsystem 804 may include any number of lenses (e.g., Fresnel lenses, convex lenses, concave lenses), apertures, filters, mirrors, prisms, and/or other optical components, possibly in combination with actuators and/or other devices. In particular, the actuators and/or other devices may translate and/or rotate one or more of the optical components to alter one or more aspects of the converging light 820. Further, various mechanical couplings may serve to maintain the relative spacing and/or the orientation of the optical components in any suitable combination.

In one embodiment, the eye-tracking subsystem 806 may generate tracking information indicating a gaze angle of an eye 801 of the viewer. In this embodiment, the control subsystem 808 may control aspects of the optical subsystem 804 (e.g., the angle of incidence of the converging light 820) based at least in part on this tracking information. Additionally, in some examples, the control subsystem 808 may store and utilize historical tracking information (e.g., a history of the tracking information over a given duration, such as the previous second or fraction thereof) to anticipate the gaze angle of the eye 801 (e.g., an angle between the visual axis and the anatomical axis of the eye 801). In some embodiments, the eye-tracking subsystem 806 may detect radiation emanating from some portion of the eye 801 (e.g., the cornea, the iris, the pupil, or the like) to determine the current gaze angle of the eye 801. In other examples, the eye-tracking subsystem 806 may employ a wavefront sensor to track the current location of the pupil.

Any number of techniques can be used to track the eye 801. Some techniques may involve illuminating the eye 801 with infrared light and measuring reflections with at least one optical sensor that is tuned to be sensitive to the infrared light. Information about how the infrared light is reflected from the eye 801 may be analyzed to determine the position(s), orientation(s), and/or motion(s) of one or more eye feature(s), such as the cornea, pupil, iris, and/or retinal blood vessels.

In some examples, the radiation captured by a sensor of the eye-tracking subsystem 806 may be digitized (i.e., converted to an electronic signal). Further, the sensor may transmit a digital representation of this electronic signal to one or more processors (for example, processors associated with a device including the eye-tracking subsystem 806). The eye-tracking subsystem 806 may include any of a variety of sensors in a variety of different configurations. For example, the eye-tracking subsystem 806 may include an infrared detector that reacts to infrared radiation. The infrared detector may be a thermal detector, a photonic detector, and/or any other suitable type of detector. Thermal detectors may include detectors that react to thermal effects of the incident infrared radiation.

In some examples, one or more processors may process the digital representation generated by the sensor(s) of the eye-tracking subsystem 806 to track the movement of the eye 801. In another example, these processors may track the movements of the eye 801 by executing algorithms represented by computer-executable instructions stored on non-transitory memory. In some examples, on-chip logic (e.g., an application-specific integrated circuit or ASIC) may be used to perform at least portions of such algorithms. As noted, eye-tracking the subsystem 806 may be programmed to use an output of the sensor(s) to track eye movement of the eye 801. In some embodiments, the eye-tracking subsystem 806 may analyze the digital representation generated by the sensors to extract eye rotation information from changes in reflections. In one embodiment, the eye-tracking subsystem 806 may use corneal reflections or glints (also known as Purkinje images) and/or the center of the eye's pupil 822 as features to track over time.

In some embodiments, the eye-tracking subsystem 806 may use the center of the eye's pupil 822 and infrared or near-infrared, non-collimated light to create corneal reflections. In these embodiments, the eye-tracking subsystem 806 may use the vector between the center of the eye's pupil 822 and the corneal reflections to compute the gaze direction of the eye 801. In some embodiments, the disclosed systems may perform a calibration procedure for an individual (using, e.g., supervised or unsupervised techniques) before tracking the user's eyes. For example, the calibration procedure may include directing users to look at one or more points displayed on a display while the eye-tracking system records the values that correspond to each gaze position associated with each point.

In some embodiments, the eye-tracking subsystem 806 may use two types of infrared and/or near-infrared (also known as active light) eye-tracking techniques: bright-pupil and dark-pupil eye tracking, which may be differentiated based on the location of an illumination source with respect to the optical elements used. If the illumination is coaxial with the optical path, then the eye 801 may act as a retroreflector as the light reflects off the retina, thereby creating a bright pupil effect similar to a red-eye effect in photography. If the illumination source is offset from the optical path, then the eye's pupil 822 may appear dark because the retroreflection from the retina is directed away from the sensor. In some embodiments, bright-pupil tracking may create greater iris/pupil contrast, allowing more robust eye tracking with iris pigmentation, and may feature reduced interference (e.g., interference caused by eyelashes and other obscuring features). Bright-pupil tracking may also allow tracking in lighting conditions ranging from total darkness to a very bright environment.

In some embodiments, the control subsystem 808 may control the light source 802 and/or optical subsystem 804 to reduce optical aberrations (e.g., chromatic aberrations and/or monochromatic aberrations) of the image that may be caused by or influenced by the eye 801. In some examples, as mentioned above, the control subsystem 808 may use the tracking information from the eye-tracking subsystem 806 to perform such control. For example, in controlling the light source 802, the control subsystem 808 may alter the light generated by the light source 802 (e.g., by way of image rendering) to modify (e.g., pre-distort) the image so that the aberration of the image caused by the eye 801 is reduced.

The disclosed systems may track both the position and relative size of the pupil (since, e.g., the pupil dilates and/or contracts). In some examples, the eye-tracking devices and components (e.g., sensors and/or sources) used for detecting and/or tracking the pupil may be different (or calibrated differently) for different types of eyes. For example, the frequency range of the sensors may be different (or separately calibrated) for eyes of different colors and/or different pupil types, sizes, and/or the like. As such, the various eye-tracking components (e.g., infrared sources and/or sensors) described herein may need to be calibrated for each individual user and/or eye.

The disclosed systems may track both eyes with and without ophthalmic correction, such as that provided by contact lenses worn by the user. In some embodiments, ophthalmic correction elements (e.g., adjustable lenses) may be directly incorporated into the systems described herein. In some examples, the color of the user's eye may necessitate modification of a corresponding eye-tracking algorithm. For example, eye-tracking algorithms may need to be modified based at least in part on the differing color contrast between a brown eye and, for example, a blue eye.

FIG. 9 is a more detailed illustration of various aspects of the eye-tracking subsystem illustrated in FIG. 8. As shown in this figure, an eye-tracking subsystem 900 may include at least one source 904 and at least one sensor 906. The source 904 generally represents any type or form of element capable of emitting radiation. In one example, the source 904 may generate visible, infrared, and/or near-infrared radiation. In some examples, the source 904 may radiate non-collimated infrared and/or near-infrared portions of the electromagnetic spectrum towards an eye 902 of a user. The source 904 may utilize a variety of sampling rates and speeds. For example, the disclosed systems may use sources with higher sampling rates in order to capture fixational eye movements of a user's eye 902 and/or to correctly measure saccade dynamics of the user's eye 902. As noted above, any type or form of eye-tracking technique may be used to track the user's eye 902, including optical-based eye-tracking techniques, ultrasound-based eye-tracking techniques, etc.

The sensor 906 generally represents any type or form of element capable of detecting radiation, such as radiation reflected off the user's eye 902. Examples of the sensor 906 include, without limitation, a charge coupled device (CCD), a photodiode array, a complementary metal-oxide-semiconductor (CMOS) based sensor device, and/or the like. In one example, the sensor 906 may represent a sensor having predetermined parameters, including, but not limited to, a dynamic resolution range, linearity, and/or other characteristic selected and/or designed specifically for eye tracking.

As detailed above, the eye-tracking subsystem 900 may generate one or more glints. As detailed above, a glint 903 may represent reflections of radiation (e.g., infrared radiation from an infrared source, such as the source 904) from the structure of the user's eye. In various embodiments, the glint 903 and/or the user's pupil may be tracked using an eye-tracking algorithm executed by a processor (either within or external to an eyeglass device). For example, an eyeglass device may include a processor and/or a memory device in order to perform eye tracking locally and/or a transceiver to send and receive the data necessary to perform eye tracking on an external device (e.g., a mobile phone, cloud server, or other computing device).

FIG. 9 shows an example image 905 captured by an eye-tracking subsystem, such as the eye-tracking subsystem 900. In this example, the image 905 may include both the user's pupil 908 and a glint 910 near the same. In some examples, the pupil 908 and/or glint 910 may be identified using an artificial-intelligence-based algorithm, such as a computer-vision-based algorithm. In one embodiment, the image 905 may represent a single frame in a series of frames that may be analyzed continuously in order to track the eye 902 of the user. Further, the pupil 908 and/or glint 910 may be tracked over a period of time to determine a user's gaze.

In one example, the eye-tracking subsystem 900 may be configured to identify and measure the inter-pupillary distance (IPD) of a user. In some embodiments, the eye-tracking subsystem 900 may measure and/or calculate the IPD of the user while the user is wearing the eyeglass device or system. In these embodiments, the eye-tracking subsystem 900 may detect the positions of a user's eyes and may use this information to calculate the user's IPD.

As noted, the eye-tracking systems or subsystems disclosed herein may track a user's eye position and/or eye movement in a variety of ways. In one example, one or more light sources and/or optical sensors may capture an image of the user's eyes. The eye-tracking subsystem may then use the captured information to determine the user's inter-pupillary distance, interocular distance, and/or a 3D position of each eye (e.g., for distortion adjustment purposes), including a magnitude of torsion and rotation (i.e., roll, pitch, and yaw) and/or gaze directions for each eye. In one example, infrared light may be emitted by the eye-tracking subsystem and reflected from each eye. The reflected light may be received or detected by an optical sensor and analyzed to extract eye rotation data from changes in the infrared light reflected by each eye.

The eye-tracking subsystem may use any of a variety of different methods to track the eyes of a user. For example, a light source (e.g., infrared light-emitting diodes) may emit a dot pattern onto each eye of the user. The eye-tracking subsystem may then detect (e.g., via an optical sensor coupled to the eyeglass device) and analyze a reflection of the dot pattern from each eye of the user to identify a location of each pupil of the user. Accordingly, the eye-tracking subsystem may track up to six degrees of freedom of each eye (i.e., 3D position, roll, pitch, and yaw) and at least a subset of the tracked quantities may be combined from two eyes of a user to estimate a gaze point (i.e., a 3D location or position in a scene where the user is looking) and/or an IPD.

In some cases, the distance between a user's pupil and a display may change as the user's eye moves to look in different directions. The varying distance between a pupil and a display as viewing direction changes may be referred to as "pupil swim" and may contribute to distortion perceived by the user as a result of light focusing in different locations as the distance between the pupil and the display changes. Accordingly, measuring distortion at different eye positions and pupil distances relative to displays and generating distortion corrections for different positions and distances may allow mitigation of distortion caused by pupil swim by tracking the 3D position of a user's eyes and applying a distortion correction corresponding to the 3D position of each of the user's eyes at a given point in time. Thus, knowing the 3D position of each of a user's eyes may allow for the mitigation of distortion caused by changes in the distance between the pupil of the eye and the display by applying a distortion correction for each 3D eye position. Furthermore, as noted above, knowing the position of each of the user's eyes may also enable the eye-tracking subsystem to make automated adjustments for a user's IPD.

In some embodiments, a display subsystem may include a variety of additional subsystems that may work in conjunction with the eye-tracking subsystems described herein. For example, a display subsystem may include a varifocal subsystem, a scene-rendering module, and/or a vergence-processing module. The varifocal subsystem may cause left and right display elements to vary the focal distance of the display device. In one embodiment, the varifocal subsystem may physically change the distance between a display and the optics through which it is viewed by moving the display, the optics, or both. Additionally, moving or translating two lenses relative to each other may also be used to change the focal distance of the display. Thus, the varifocal subsystem may include actuators or motors that move displays and/or optics to change the distance between them. This varifocal subsystem may be separate from or integrated into the display subsystem. The varifocal subsystem may also be integrated into or separate from its actuation subsystem and/or the eye-tracking subsystems described herein.

In one example, the display subsystem may include a vergence-processing module configured to determine a vergence depth of a user's gaze based on a gaze point and/or an estimated intersection of the gaze lines determined by the eye-tracking subsystem. Vergence may refer to the simultaneous movement or rotation of both eyes in opposite directions to maintain single binocular vision, which may be naturally and automatically performed by the human eye. Thus, a location where a user's eyes are verged is where the user is looking and is also typically the location where the user's eyes are focused. For example, the vergence-processing module may triangulate gaze lines to estimate a distance or depth from the user associated with intersection of the gaze lines. The depth associated with intersection of the gaze lines may then be used as an approximation for the accommodation distance, which may identify a distance from the user where the user's eyes are directed. Thus, the vergence distance may allow for the determination of a location where the user's eyes should be focused and a depth from the user's eyes at which the eyes are focused, thereby providing information (such as an object or plane of focus) for making adjustments to an eyeglass device (e.g., to a varifocal optical element of the eyeglass device).

The vergence-processing module may coordinate with the eye-tracking subsystems described herein to make adjustments to the display subsystem to account for a user's vergence depth. When the user is focused on something at a distance, the user's pupils may be slightly farther apart than when the user is focused on something close. The eye-tracking subsystem may obtain information about the user's vergence or focus depth and may adjust the display subsystem to be closer together when the user's eyes focus or verge on something close and to be farther apart when the user's eyes focus or verge on something at a distance.

The eye-tracking information generated by the above-described eye-tracking subsystems may also be used, for example, to modify various aspect of how different computer-generated images are presented. For example, a display subsystem may be configured to modify, based on information generated by an eye-tracking subsystem, at least one aspect of how the computer-generated images are presented. For instance, the computer-generated images may be modified based on the user's eye movement, such that if a user is looking up, the computer-generated images may be moved upward on the screen. Similarly, if the user is looking to the side or down, the computer-generated images may be moved to the side or downward on the screen. If the user's eyes are closed, the computer-generated images may be paused or removed from the display and resumed once the user's eyes are back open.

The above-described eye-tracking subsystems can be incorporated into one or more of the various eyeglass devices and systems described herein in a variety of ways. For example, one or more of the various components of the system 800 and/or eye-tracking subsystem 900 may be incorporated into the eyeglass device 200 in FIG. 2, the lens assembly 300 in FIGS. 3A-3C, the varifocal optical element 400 in FIGS. 4A-4C, and/or the eyeglass device 500 in FIG. 5, to enable these systems to perform various eye-tracking tasks (including one or more of the eye-tracking operations described herein).

The following example embodiments are also included in the present disclosure:

Example 1: An eyeglass device, which may include: a frame shaped and sized to be worn by a user at least partially in front of the user's eyes; a varifocal optical element mounted to the frame to be in a position in front of the user's eyes when the eyeglass device is worn by the user, wherein the varifocal optical element includes a substantially transparent actuator positioned at least partially within an optical aperture of the varifocal optical element and configured to alter a shape of the varifocal optical element upon actuation; and an eye-tracking element mounted to the frame, wherein: the eye-tracking element is configured to track at least a gaze direction of the user's eyes, and the varifocal optical element is configured to change, based on information from the eye-tracking element, in at least one optical property including a focal distance.

Example 2: The eyeglass device of Example 1, wherein the varifocal optical element includes: a substantially transparent support element; the substantially transparent actuator coupled to the support element at least along a periphery of the actuator; and a substantially transparent deformable medium disposed between the support element and the actuator.

Example 3: The eyeglass device of Example 1 or Example 2, wherein the actuator includes a substantially transparent electroactive polymer.

Example 4: The eyeglass device of Example 3, wherein the actuator further includes at least one substantially transparent electrode coupled to the electroactive polymer.

Example 5: The eyeglass device of any of Examples 1 through 4, further including a depth-sensing element mounted to the frame, wherein: the depth-sensing element is configured to determine a distance from the frame to objects and surfaces in front of the user, and the varifocal optical element is configured to change in the at least one optical property further based on information from the depth-sensing element.

Example 6: The eyeglass device of Example 5, wherein the depth-sensing element includes a time-of-flight sensor configured to emit light and detect the emitted light after reflecting from the objects and surfaces and to measure the time-of-flight of the light from emission to detection.

Example 7: The eyeglass device of Example 5 or example 6, wherein the depth-sensing element includes a structured light sensor including an emitter that projects structured light and an image sensor that detects the projected structured light after reflecting from the objects and surfaces and to determine the depth of the objects and surfaces by analyzing changes in the reflected structured light.

Example 8: The eyeglass device of any of Examples 1 through 7, wherein the eye-tracking element is further configured to estimate a vergence angle and gaze depth of the user's eyes.

Example 9: The eyeglass device of any of Examples 1 through 8, further including an optical lens mounted to the frame such that the user can view the world through at least the optical lens and the varifocal optical element.

Example 10: The eyeglass device of Example 9, wherein the optical lens includes a prescription lens.

Example 11: The eyeglass device of any of Examples 1 through 10, wherein the eye-tracking element is positioned at least partially within the optical aperture of the varifocal optical element.

Example 12: The eyeglass device of any of Examples 1 through 11, further including a substantially transparent protective cover mounted to the frame adjacent to the varifocal optical element.

Example 13: The eyeglass device of any of Examples 1 through 12, wherein the varifocal optical element is configured to further change in the at least one optical property based on a passage of a predetermined time.

Example 14: The eyeglass device of Example 13, wherein the predetermined time is less than a day.

Example 15: The eyeglass device of Example 13, wherein the predetermined time is more than a day.

Example 16: A method of forming an eyeglass device, which method may include: mounting a varifocal optical element to an eyeglass frame to be in a position in front of a user's eye when the eyeglass device is worn by the user, wherein the varifocal optical element includes a substantially transparent actuator positioned at least partially within an optical aperture of the varifocal optical element and is configured to change in at least one optical property including a focal distance; and mounting an eye-tracking element to the eyeglass frame, wherein the eye-tracking element is configured to track at least a gaze direction of the user's eye, wherein the varifocal optical element is configured to change in the at least one optical property based on information from the eye-tracking element.

Example 17: The method of Example 16, further including mounting a depth-sensing element to the eyeglass frame, wherein: the depth-sensing element is configured to determine a distance from the frame to objects and surfaces in front of the user, and the varifocal optical element is configured to change in the at least one optical property further based on information from the depth-sensing element.

Example 18: The method of Example 16 or Example 17, wherein mounting the eye-tracking element to the eyeglass frame includes positioning at least a portion of the eye-tracking element within an optical aperture of the eyeglass frame.

Example 19: A method of operating an eyeglass device, which method may include: tracking, with an eye-tracking element mounted to an eyeglass frame, at least a gaze direction of a user's eyes; determining, based at least in part on the tracked gaze direction, a distance at which the user's eyes are fixated; and changing, based on the tracked gaze direction and the determined distance, at least one optical property of a varifocal optical element mounted to the eyeglass frame, wherein: the at least one optical property includes a focal distance; and the varifocal optical element includes a substantially transparent actuator positioned at least partially within an optical aperture of the varifocal optical element and configured to alter a shape of the varifocal optical element upon actuation.

Example 20: The method of Example 19, further including changing, with the varifocal optical element, a baseline optical power of the varifocal optical element after a predetermined time.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. An eyeglass device, comprising:
   a frame shaped and sized to be worn by a user at least partially in front of the user's eyes;
   a varifocal optical element mounted to the frame to be in a position in front of the user's eyes when the eyeglass device is worn by the user, wherein the varifocal optical element comprises a substantially transparent actuator positioned at least partially within an optical aperture of the varifocal optical element and configured to alter a shape of the varifocal optical element upon actuation;
   an eye-tracking element mounted to the frame, wherein:
      the eye-tracking element is configured to track at least a gaze direction of the user's eyes, and
      the varifocal optical element is configured to change, based on information from the eye-tracking element, in at least one optical property including a focal distance; and
   a manual input configured for the user to deactivate automatic changing of the at least one optical property by the varifocal optical element.

2. The eyeglass device of claim 1, wherein the varifocal optical element comprises:
   a substantially transparent support element;
   the substantially transparent actuator coupled to the support element at least along a periphery of the actuator; and
   a substantially transparent deformable medium disposed between the support element and the actuator.

3. The eyeglass device of claim 1, wherein the actuator comprises a substantially transparent electroactive polymer.

4. The eyeglass device of claim 3, wherein the actuator further comprises at least one substantially transparent electrode coupled to the electroactive polymer.

5. The eyeglass device of claim 1, further comprising a depth-sensing element mounted to the frame, wherein:
   the depth-sensing element is configured to determine a distance from the frame to objects and surfaces in front of the user, and
   the varifocal optical element is configured to change in the at least one optical property further based on information from the depth-sensing element.

6. The eyeglass device of claim 5, wherein the depth-sensing element comprises a time-of-flight sensor configured to emit light and detect the emitted light after reflecting from the objects and surfaces and to measure the time-of-flight of the light from emission to detection.

7. The eyeglass device of claim 5, wherein the depth-sensing element comprises a structured light sensor including an emitter that projects structured light and an image sensor that detects the projected structured light after reflecting from the objects and surfaces and to determine the depth of the objects and surfaces by analyzing changes in the reflected structured light.

8. The eyeglass device of claim 1, wherein the eye-tracking element is further configured to estimate a vergence angle and gaze depth of the user's eyes.

9. The eyeglass device of claim 1, further comprising an optical lens mounted to the frame such that the user can view the world through at least the optical lens and the varifocal optical element.

10. The eyeglass device of claim 9, wherein the optical lens comprises a prescription lens.

11. The eyeglass device of claim 1, wherein the eye-tracking element is positioned at least partially within the optical aperture of the varifocal optical element.

12. The eyeglass device of claim 1, wherein the varifocal optical element is configured to further change in the at least one optical property based on a passage of a predetermined time.

13. The eyeglass device of claim 12, wherein the predetermined time is less than a day.

14. A method of forming an eyeglass device, the method comprising:
   mounting a varifocal optical element to an eyeglass frame to be in a position in front of a user's eye when the eyeglass device is worn by the user, wherein the varifocal optical element comprises a substantially transparent actuator positioned at least partially within an optical aperture of the varifocal optical element and is configured to change in at least one optical property including a focal distance based, at least in part, on a passage of a predetermined time; and mounting an eye-tracking element to the eyeglass frame, wherein the eye-tracking element is configured to track at least a gaze direction of the user's eye, wherein the varifocal optical element is configured to change in the at least one optical property based on information from the eye-tracking element.

15. The method of claim 14, further comprising mounting a depth-sensing element to the eyeglass frame, wherein:

the depth-sensing element is configured to determine a distance from the frame to objects and surfaces in front of the user, and the varifocal optical element is configured to change in the at least one optical property further based on information from the depth-sensing element.

16. The method of claim 14, wherein mounting the eye-tracking element to the eyeglass frame comprises positioning at least a portion of the eye-tracking element within an optical aperture of the eyeglass frame.

17. A method of operating an eyeglass device, the method comprising:

tracking, with an eye-tracking element mounted to an eyeglass frame, at least a gaze direction of a user's eyes;

determining, based at least in part on the tracked gaze direction, a distance at which the user's eyes are fixated;

changing, based on the tracked gaze direction and the determined distance, at least one optical property of a varifocal optical element mounted to the eyeglass frame, wherein:

the at least one optical property includes a focal distance; and the varifocal optical element comprises a substantially transparent actuator positioned at least partially within an optical aperture of the varifocal optical element and configured to alter a shape of the varifocal optical element upon actuation; and changing, with the varifocal optical element, a baseline optical power of the varifocal optical element after a predetermined time.

18. The method of claim 17, further comprising adjusting a transition rate of the changing of the at least one optical property of the varifocal optical element.

* * * * *